(12) United States Patent
Lim et al.

(10) Patent No.: US 8,406,519 B1
(45) Date of Patent: Mar. 26, 2013

(54) COMPOSITING HEAD REGIONS INTO TARGET IMAGES

(75) Inventors: Suk Hwan Lim, Mountain View, CA (US); Qian Lin, Santa Clara, CA (US); Adam C. Petruszka, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 548 days.

(21) Appl. No.: 12/721,555

(22) Filed: Mar. 10, 2010

(51) Int. Cl.
*G06K 9/00* (2006.01)

(52) U.S. Cl. .......................................... 382/170
(58) Field of Classification Search ................. None
See application file for complete search history.

(56) References Cited

U.S. PATENT DOCUMENTS

| | | | | |
|---|---|---|---|---|
| 5,469,536 A * | 11/1995 | Blank | | 345/594 |
| 6,535,269 B2 * | 3/2003 | Sherman et al. | | 352/6 |
| 6,661,496 B2 * | 12/2003 | Sherman et al. | | 352/6 |
| 7,636,128 B2 | 12/2009 | Sun | | |
| 7,859,551 B2 * | 12/2010 | Bulman et al. | | 345/630 |
| 2005/0231513 A1 * | 10/2005 | LeBarton et al. | | 345/473 |
| 2007/0237421 A1 | 10/2007 | Luo | | |
| 2008/0043041 A2 | 2/2008 | Hedenstroem | | |

FOREIGN PATENT DOCUMENTS

| | | |
|---|---|---|
| JP | 11306318 | 11/1999 |
| WO | 2009094661 A1 | 7/2009 |

OTHER PUBLICATIONS

L. Zhang, H. Ai, S. Xin, C. Huang, S. Tsukiji, S. Lao, "Robust Face Alignment Based on Local Texture Classifiers", The IEEE International Conference on Image Processing (ICIP-05), Genoa, Italy, Sep. 11-14, 2005.

A. Levin, A. Rav-Acha, D. Lischinski, "Spectral Matting", IEEE Transactions PAMI, Oct. 2008.

Yuri Y. Boykov et al., "Interactive Graph Cuts for Optimal Boundary & Region Segmentation of Objects in N-D Images," Proceedings of "Internation Conference on Computer Vision", Vancouver, Canada, vol. I, p. 105, Jul. 2001.

* cited by examiner

Primary Examiner — Vikkram Bali (57) ABSTRACT

A head image from a source image based on a model of the source image as a mixture of at least two image layers. One or more of the image layers are components of a foreground corresponding to the source head image and one or more other ones of the image layers are components of a background corresponding to parts of the source image outside the source head image. The source head image is color-adjusted based on skin regions of a target head image in a target image. The color-adjusted source head image is geometrically transformed to conform to the target head image in pose and size. A composite image is generated. In this process, the geometrically transformed and color-adjusted source head image is composited into a version of the target image at a location corresponding to the target head image.

20 Claims, 6 Drawing Sheets

COMPOSITING HEAD REGIONS INTO TARGET IMAGES

BACKGROUND

Many consumers have the desire for self-expression through "personalized" content. With rapid adoption of digital photography, many amateur images have been captured and used to create photo-driven products such as personal photobooks, calendars and scrapbooks. There are many applications, however, in which a user may want to merge an image of a person into another image to create the impression that the person was actually present in that image. One example application of this type is "personalized" merchandise that mashes up commercial content (e.g., images of characters, actors, sports stars, and other celebrities) with the users personal images. Although it is possible to merge images of people into other image content using powerful photo editing tools, such as Adobe® Photoshop®, these tools require advanced skills and extensive manual effort.

What are needed are improved systems and methods of compositing images into target images.

DETAILED DESCRIPTION

In the following description, like reference numbers are used to identify like elements. Furthermore, the drawings are intended to illustrate features of embodiments in a diagrammatic manner. The drawings are not intended to depict every feature of actual embodiments nor relative dimensions of the depicted elements, and are not drawn to scale.

I. DEFINITION OF TERMS

An "image" broadly refers to any type of visually perceptible content that may be rendered on a physical medium (e.g., a display monitor or a print medium). Images may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

The term "image forming element" refers to an addressable region of an image. In some examples, the image forming elements correspond to pixels, which are the smallest addressable units of an image. Each image forming element has at least one respective "image value" that is represented by one or more bits. For example, an image forming element in the RGB color space includes a respective image value for each of the colors red, green, and blue, where each of the image values may be represented by one or more bits.

The term "head image" means an image of at least a portion of a person's head that includes at least a portion of the person's face (e.g., eyes, nose, mouth, lips, chin, and the bottom portion of the forehead) and at least a portion of the person's head outside the face (e.g., the top portion of the forehead, the top of the head including the hair, and the ears).

A "computer" is any machine, device, or apparatus that processes data according to computer-readable instructions that are stored on a computer-readable medium either temporarily or permanently. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible medium capable storing information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

As used herein, the term "includes" means includes but not limited to, the term "including" means including but not limited to. The term "based on" means based at least in part on.

II. COMPOSITING HEAD REGIONS INTO TARGET IMAGES

A. Introduction

The examples that are described herein provide improved systems and methods of compositing images into target images. These examples segment head regions from source images with high-fidelity, which allows the segmented head regions to be merged seamlessly into target images to produce composite images with more authentic-looking merged results than methods that only swap faces. For example, at least some of these examples are able to extract head regions that include both hair and faces and composite the extracted head regions in place of target head regions in target images. This improves the authenticity of the appearance of the images of persons that are merged in the composite images because hair can play an important role in the appearance of a person.

Figure 1:
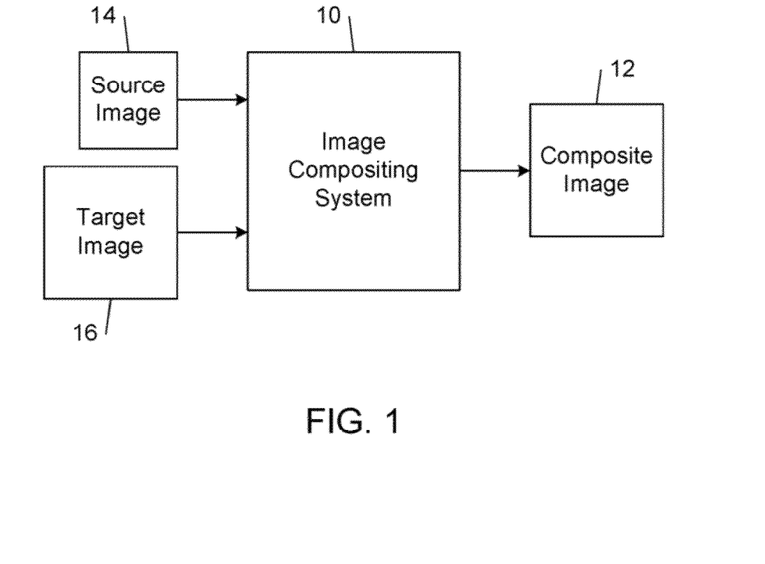
FIG. 1 is a block diagram of an example of an image compositing system producing a composite image from a source image and target image.

FIG. 1 shows an example of an image compositing system 10 that generates a composite image 12 from a source image 14 and a target image 16 (which also may be referred to as a "template image"). In particular, the image compositing system 10 extracts, manipulates, and blends a head image in the source image 14 into the target image 16 at a location that corresponds to a target head image. In this process, the image compositing system 10 segments a source head image from the source image 14, compensates for pose and skin-tone differences between the source head image and the target head image, warps the source head image to fit into the space and pose of the target head image in the target image 16, and embeds the source head image seamlessly into the target image 16. In this way, the image compositing system 10 provides a fully automated process of creating composite images in which the head in one image is fully replaced by a head from another image. In some examples, the image compositing system 10 outputs the composite image 12 by storing it a data storage device (e.g., in a database), rendering it on a display (e.g., in a user interface generated by a software application program), or rendering it on a print medium (e.g., paper).

In general, the source image 14 and the target image 16 may be any type of images, including amateur and professional photographs and commercially produced images. In one example use scenario, a user provides the source image 14 in the form of a personal photograph that has a head region showing a person's face (e.g., the user's face), and a content provider provides the target image 16 that includes a head region showing another person's face. The image compositing system 10 processes the source and target images 14, 16 and outputs the composite image 12, which shows a version of the target image in which the head region from the source image 14 replaces the head region of the target image 16. In this use scenario, the image compositing system 10 allows consumers to create personalized media with their own images. Examples of possible applications include: (i) licensed merchandise that combines user's head images with their favorite celebrities, (ii) personalized children's storybooks (e.g., where the child's head images are weaved into the stories with popular characters), and (iii) personalized marketing material.

Figure 2:
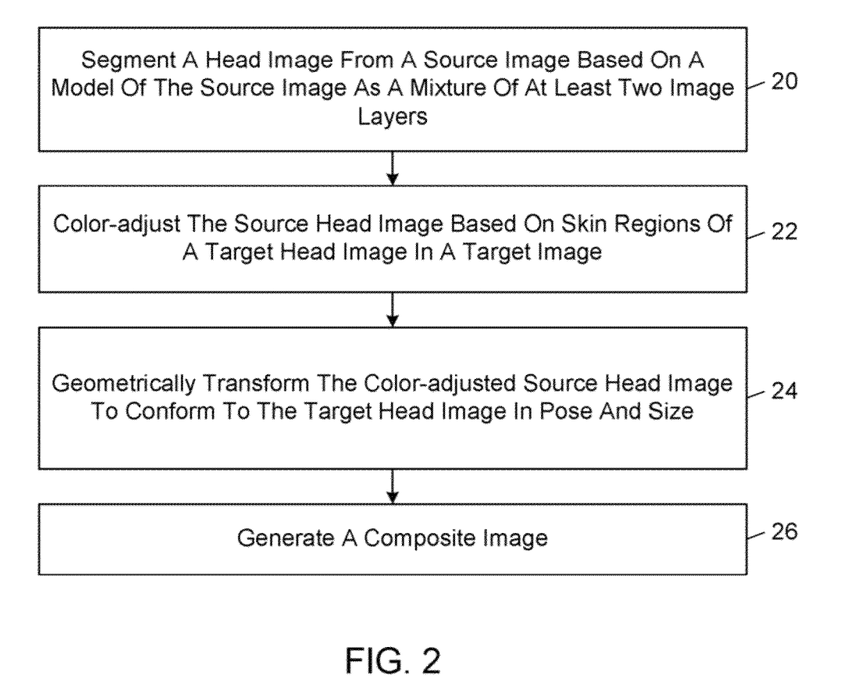
FIG. 2 is a flow diagram of an example of an image compositing method.

FIG. 2 shows an example of a method by which the image compositing system 10 generates the composite image 12 from the source image 14 and the target image 16. In accordance with this method, the image compositing system 10 segments a head image from a source image based on a model of the source image as a mixture of at least two image layers (FIG. 2, block 20). In this model, one or more of the image layers are components of a foreground corresponding to the source head image and one or more other ones of the image layers are components of a background corresponding to parts of the source image that are outside the source head image. The image compositing system 10 color-adjusts the source head image based on skin regions of a target head image in a target image (FIG. 2, block 22). The image compositing system 10 geometrically transforms the color-adjusted source head image to conform to the target head image in pose and size (FIG. 2, block 24). The image compositing system 10 generates a composite image (FIG. 2, block 26). In this process, the image compositing system 10 composites the geometrically transformed source head region into the target image at a location corresponding to the target head image.

In some examples, the image compositing system 10 processes both the source image 14 and the target image 16 in realtime. In other examples, metadata describing features of the target image 16 (e.g., the size, location and pose of a person's face or other body parts, skin image value statistics, and a target skin map identifying skin areas of the target image) may be pre-computed and associated with the target image 16 so that this information need not be computed in realtime, thereby reducing the time and computational resources needed to produce the composite image 12.

B. Example of Generating the Composite Image

1. Introduction

Figure 3:
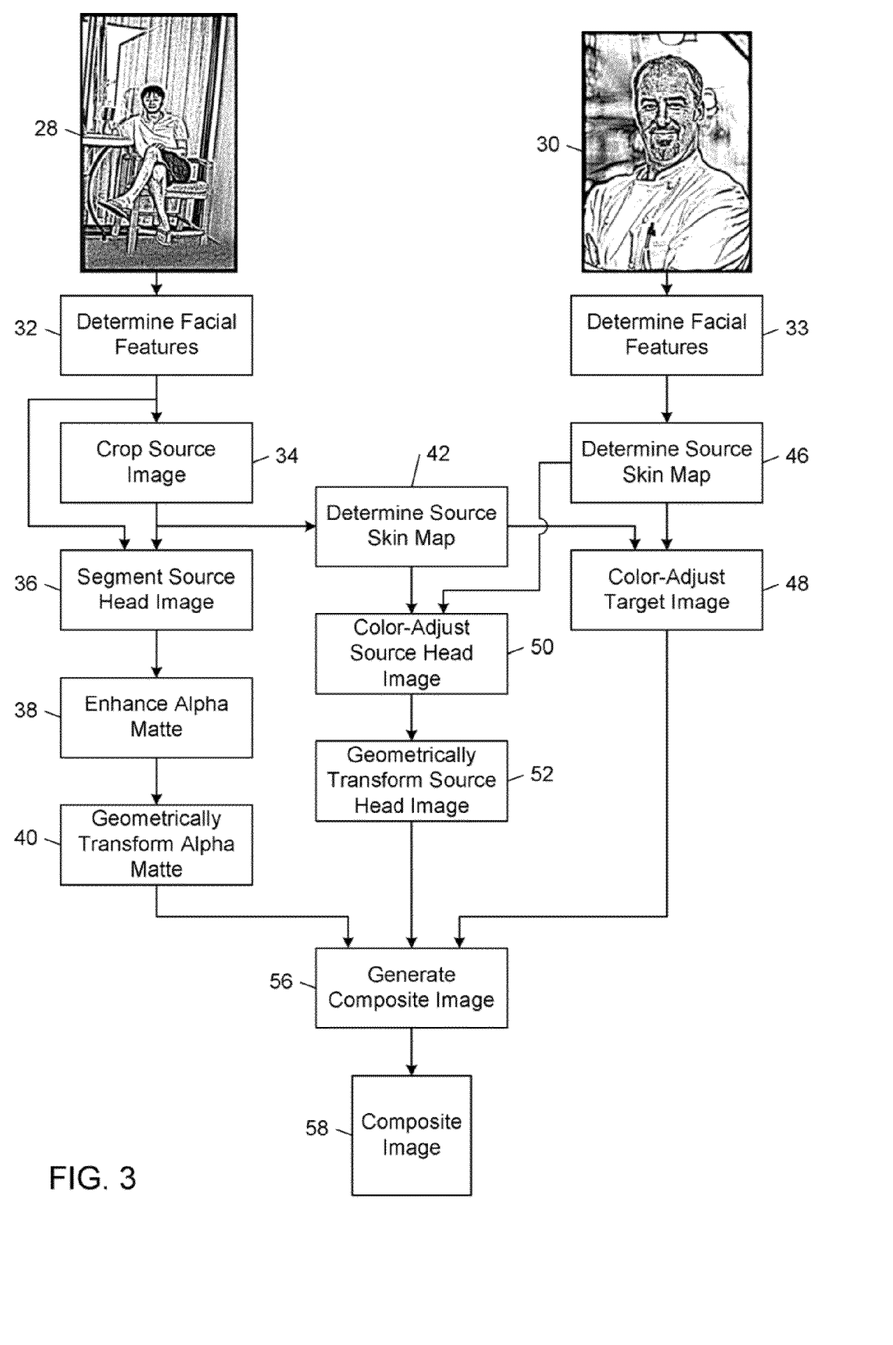
FIG. 3 is a flow diagram of an example of an image compositing method.

FIG. 3 shows an example of the image compositing method of FIG. 2. This example is described in the context of a source image 28 that shows a view of a first person sitting in a chair and a target image 30 that shows a close-up view of the top part of a second person's body.

In accordance with the method of FIG. 3, the image compositing system 10 determines facial features in the source image 28 (FIG. 3, block 32). In this process, the image compositing system 10 detects the first person's face in the source image 28 and computes the coordinates of a pre-defined set of facial features, which are used to guide the processes used in subsequent stages of the image compositing process. In the illustrated example, the image compositing system 10 uses the same facial feature determination process to determine facial features in the target image 30 (FIG. 3, block 33). In some examples, the facial features of the target image 30 are pre-computed and stored in association with the target image 30 (e.g., as metadata).

After the facial features have been determined (FIG. 3, block 32), the image compositing system 10 crops the source image 28 to a region that includes the first person's head as well as regions surrounding the person's head (FIG. 3, block 34). The purpose of the cropping of the source image 28 is to reduce the time and computational resources needed for the subsequent processing steps.

After the source image 28 has been cropped (FIG. 3, block 32), the image compositing system 10 segments a source head image from the cropped image (FIG. 3, block 36). The image compositing system 10 segments the source head image from the source image 28 based on a model of the source image as a mixture of at least two image layers, where one or more of the image layers are components of a foreground corresponding to the source head image and one or more other ones of the image layers are components of a background corresponding to parts of the source image that are outside the source head image. In this process, the image compositing system 10 determines a initialization map that identifies regions of the source image that correspond to the foreground and identifies regions of the source image that correspond to the background. The image compositing system 10 determines regions of facial image content and non-facial image content (e.g., hair image content) in the source image 28 based on locations of respective ones of the facial features, and labels the determined regions as foreground in the initialization map. Optionally, the image compositing system 10 derives an alpha matte from the initialization map. The alpha matte specifies respective contributions of the image layers to the foreground and the background. The alpha matte typically has a higher spatial resolution than the initialization map and may be more suitable for regions that include hair.

In the illustrated example, the image compositing system 10 enhances the alpha matte (FIG. 3, block 38). In this process, the image compositing system 10 crops neck regions from the foreground in the alpha matte. In some examples, the image compositing system 10 also smooths the alpha matte (e.g., by interpolation) and performs contrast enhancement on the alpha matte.

After enhancing the alpha matte (FIG. 3, block 38), the image compositing system 10 geometrically transforms the alpha matte to conform to the target head image in pose and size (FIG. 3, block 40).

Based on the cropped source image, the image compositing system 10 generates a source skin map that segments skin areas from other areas in the cropped source image (FIG. 3, block 42). In the illustrated example, the image compositing system 10 uses the same process to generate a target skin map that segments skin areas from other areas in the target image 30 (FIG. 3, block 46). In some examples, the target skin map is pre-computed and stored in association with the target image 30 (e.g., as metadata).

Based on the source and target skin maps, the image compositing system 10 color-adjusts the source head image (FIG. 3, block 50). In this process, image compositing system 10 performs skin tone compensation on the facial skin pixels in the cropped source image. In some examples, the image compositing system 10 equalizes the contrast differences between the facial areas identified in the source and target skin maps. In some of these examples, the image compositing system 10 computes the variances for pixel intensities of the skin pixels identified in the source and target skin maps and equalizes these different sets of pixels using a linear transformation that is designed to equalize the variances. In some examples, the image compositing system 10 also performs relighting processing on the cropped source image.

In the illustrated example, the image compositing system 10 also performs skin tone compensation on non-facial skin pixels in the target image that are identified in the target skin map (FIG. 3, block 48). In this process, the image compositing system 10 transforms the skin tones of the non-facial skin regions using a linear transformation that maps the distribution of skin tones in the target image 30 to a distribution that conforms to the skin tone distribution of the facial skin pixels in the skin-tone-compensated cropped source head image.

The image compositing system 10 geometrically transforms the skin-tone-compensated cropped source image to conform to the target head image in pose and size (FIG. 3, block 52).

The image compositing system 10 generates the composite image 58 based on the geometrically transformed alpha matte, the geometrically transformed and skin-tone-compensated cropped source image, and the color-adjusted target image (FIG. 3, block 56). In this process, the composite image 58 is created by performing weighted blending of the geometrically transformed and skin-tone-compensated cropped source image and the color-adjusted target image, where the weights are defined in the geometrically transformed alpha matte.

The stages of the composite image generation process of FIG. 3 are described in further detail below.

2. Determining Facial Features

As explained above, the image compositing system 10 determines facial features in the source image 28 (FIG. 3, block 32). In this process, the image compositing system 10 detects the face in the source image 28 and computes the coordinates of a pre-defined set of facial features. In a typical face detection process, the image compositing system 10 initially determines the presence and rough location of each face in the source image 28. After the rough location of a face has been detected, the image compositing system 10 aligns (or registers) the detected face. In this process, one or more feature points in the detected face (e.g., the eyes, the nose tip, and the mouth or lips) are extracted. In general, any type of feature extraction process may be used including but not limited to edge, line and curve based feature extraction methods, extraction methods based on templates that are designed to detect specific features points (e.g., the eyes and mouth), and structural matching methods.

Figure 4:
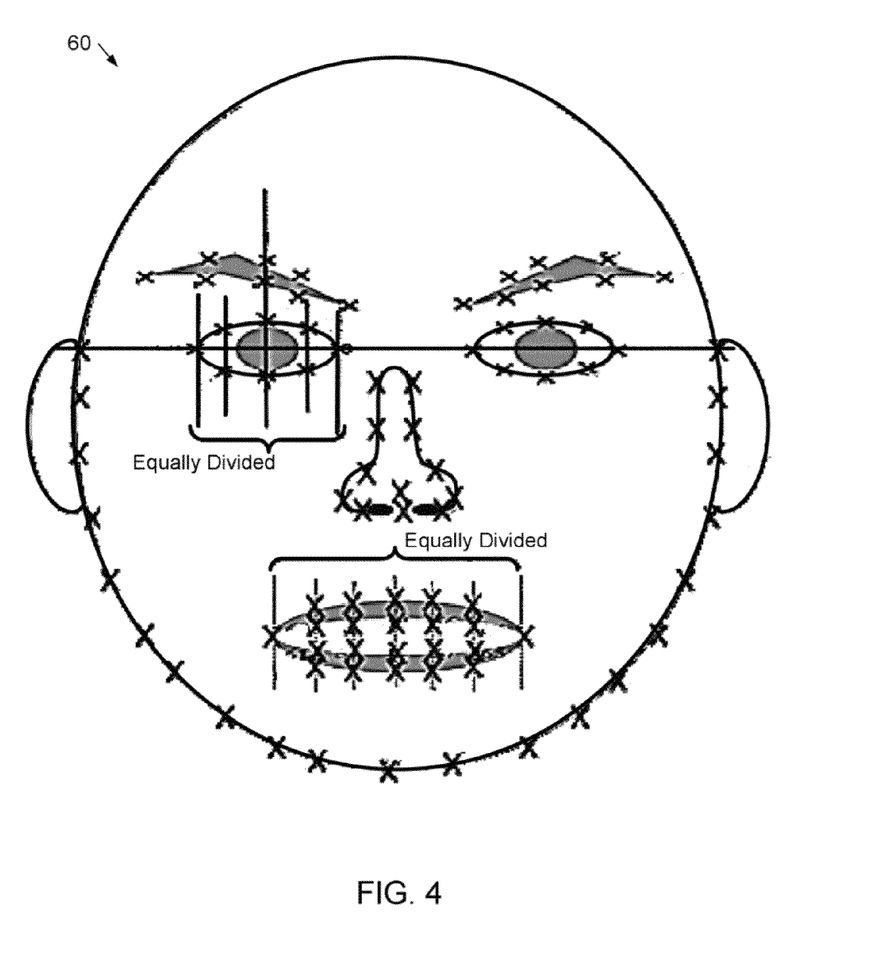
FIG. 4 is a diagrammatic view of an example head region on which are demarcated the locations of a set of facial features in accordance with an example.

In one example, the image compositing system 10 determines eighty-eight feature point locations, including point locations in the eyes, eye-brows, nose and chin. FIG. 4 shows an example head region 60 on which are demarcated (by "X" marks) the locations of a set of facial features that are determined in accordance with this example. These point locations are used to guide the processes used in subsequent stages of the image compositing process. A variety of different methods may be used to determine the facial feature locations. An example facial feature location process that may be used to determine the facial feature locations is described in L. Zhang et al., "Robust Face Alignment Based on Local Texture Classifiers," The IEEE International Conference on Image Processing (ICIP-05), Genoa, Italy, Sep. 11-14, 2005.

3. Cropping the Source Image

Figure 5:
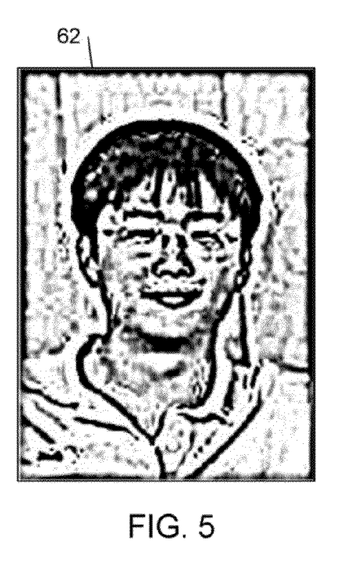
FIG. 5 is a diagrammatic view of an example image cropped from an example source image.

After the facial features have been determined (FIG. 3, block 32), the image compositing system 10 crops the source image 28 (FIG. 3, block 34). The purpose of the cropping the source image 28 is to reduce the time and computational resources needed for the subsequent processing steps. In some examples, the image compositing system 10 determines the location and dimensions of a rectangular crop boundary box as a function of the locations of at least some of the facial features. For example, in some of these examples, the image compositing system 10 locates a facial bounding box encompassing some or all portions of the detected face and then determines the horizontal and vertical dimensions of the rectangular crop boundary box by scaling the facial bounding box based on distances between selected ones of the feature points (e.g., the distance between the nose to the chin and the distance between the eyes) using empirically determined scaling factors. The crop boundary box typically is sized generously such that it includes the first person's head as well as regions surrounding the person's head. FIG. 5 shows an example image 62 that was cropped from the source image 28.

4. Segmenting the Head Image

After the source image 28 has been cropped (FIG. 3, block 32), the image compositing system 10 segments a head image from the cropped image (FIG. 3, block 36).

The image compositing system 10 segments the head image from the source image 28 based on a model of the source image as a mixture of at least two image layers, where one or more of the image layers are components of a foreground corresponding to the source head image and one or more other ones of the image layers are components of a background corresponding to parts of the source image outside the source head image. In some examples, the source image ($I_i$) is modeled as a convex combination of K image layers $F^1, \ldots, F^K$ in accordance with equation (1):

$$I_i = \sum_{k=1}^{K} \alpha_i^k F_i^k, \tag{1}$$

where the K vectors $\alpha_i^k$ are the matting components of the source image that specify the fractional contribution of each layer to the final color of each pixel of the source image. The alpha matte is determined from the matting components based on a specification of the particular ones of the matting components that are part of the foreground. For example, if $\alpha^{k1}, \ldots, \alpha^{kn}$ are designated as foreground components, then the alpha matte is obtained simply by adding these components together (i.e., $\alpha = \alpha^{k1} + \ldots + \alpha^{kn}$).

In some of these examples, the source image ($I_t$) is modeled as a mixture of two images (i.e., a foreground image F and a background image B) in accordance with equation (2):

$$I(x) = \alpha(x)F(x) + (1-\alpha(x))B(x) \qquad (2)$$

where x is a pixel location and $a \in [0, 1]$ is an alpha matte that quantifies the mixture. In a typical initialization map, $\alpha$ is either 0 or 1 rather than taking intermediate values. Such an initialization map performs "hard" classification of pixels either fully belonging to the foreground or the background.

In the head image segmentation process, the image compositing system 10 initially determines an initialization map that identifies regions of the source image that correspond to the foreground and that identifies regions of the source image that correspond to the background. The initialization map is designed to provide rough designations of both foreground and background regions, where regions of the cropped source image that are highly likely to be parts of a face are marked as the foreground (e.g., "white") are regions that are highly likely to be non-facial areas are marked as the background (e.g., "black"). The remaining unmarked regions of the cropped source image are left as currently unknown; these regions will be labeled as foreground or background in the subsequent alpha matte generation process. The image compositing system 10 typically determines the initialization map by identifying regions of facial image content and regions non-facial image content (e.g., hair image content) in the cropped source image based on locations of respective ones of the facial features.

Figure 6:
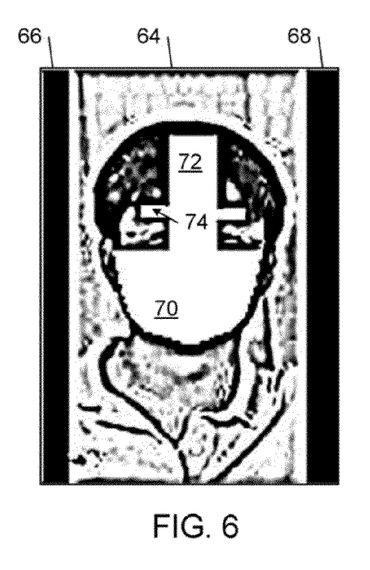
FIG. 6 is a diagrammatic view of an example initialization map identifying foreground and background regions of the cropped image of FIG. 5.

FIG. 6 is a diagrammatic view of an example initialization map 64 that identifies foreground regions (labeled white) and background regions (labeled black) in the cropped image 62. In the illustrated example, the image compositing system 10 designates two vertical margin regions 66, 68 at the far left and right sides of the cropped source image as background regions in the initialization map. The horizontal widths of these margin regions typically are determined as a function of a measure of the size of the face (e.g., the distance between the locations of the ears or the distance between the locations of the eyes). In this example, the image compositing system 10 designates a region of the face that is likely to include the nose, the mouth, the chin, the eyebrows and at least part of the hair as foreground regions in the initialization map. In some of these examples, this foreground region corresponds to a superposition of (i) a half-oval region 70 that extends from the bottom location of the chin to a horizontal line extending across the two ear locations, (ii) a vertical region 72 that extends from the bottom chin location through the nose location to a terminal point that corresponds to a scaled distance between the bottom chin location and the nose location, and (iii) a horizontal strip 74 that is located vertically in the forehead region based on an empirically determining scaling factor applied to a ratio between the distance from the thin to the lip to the distance from the lip to the nose and has dimensions that are determined based on measured distances between facial feature point locations (e.g., the distance between the centers of the eyes).

In some examples, the identified foreground and background regions in the initialization map are used as initial seed points for a k-means clustering algorithm which outputs an enhanced initialization map.

The image compositing system 10 derives the alpha matte from the enhanced initialization map. As explained above, the alpha matte specifies respective contributions of the image layers to the foreground and background. The image compositing system 10 refines the enhanced initialization map by applying the enhanced initialization map as a tri-map in an image matting process that generates the alpha-map, which conveys the desired segmentation of the source head image. The image matting process classifies the unknown regions of the enhanced initialization map as foreground or background based on color statistics in the known foreground and background regions. In general, a variety of different supervised image matting processes may be used to generate the alpha matte from the enhanced initialization map, including Poisson matting processes (see, e.g., J. Sun et al., "Poisson Matting," ACM SIGGRAPH, 2004) and spectral matting processes (see, e.g., A. Levin et al., "Spectral Matting," IEEE Transactions PAMI, October 2008). Image matting processes of these types are able to produce high quality segmentation maps of fine details of head image, such as regions of hair.

Figure 7:
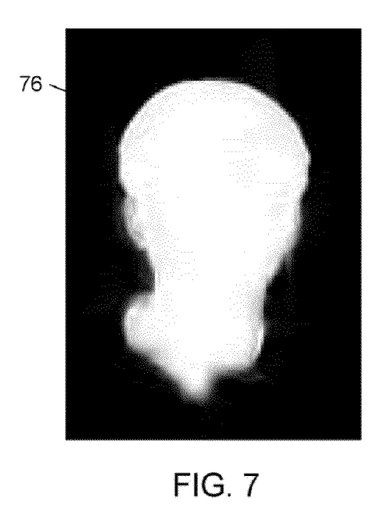
FIG. 7 is a diagrammatic view of an example alpha matte derived from the initialization map of FIG. 6 in accordance with an example.

FIG. 7 shows an example alpha matte that is derived from the initialization map 64 of FIG. 6 in accordance with the process described above.

In the illustrated example, the image compositing system 10 enhances the alpha matte (FIG. 3, block 38). In this process, the image compositing system 10 crops a neck region from the foreground in the alpha matte. In some examples, the image compositing system 10 removes the neck region by reclassifying an oval foreground region below the determined location of the chin region as part of the background. In some examples, the image compositing system 10 also smooths the alpha matte (e.g., by interpolation) where the cropping took place and performs contrast enhancement on the cropped alpha matte to produce an enhanced alpha matte.

Figure 8:
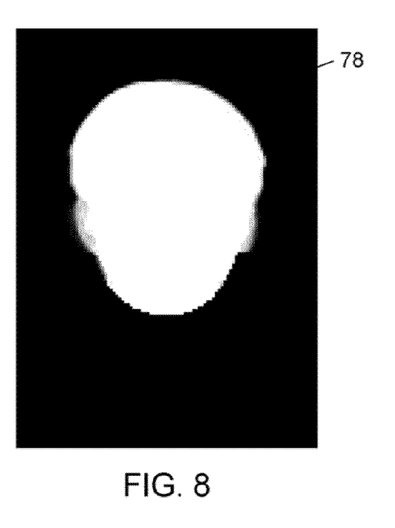
FIG. 8 is a diagrammatic view of an example enhanced alpha matte derived from the alpha matte of FIG. 7.

FIG. 8 shows an example enhanced alpha matte 78 that is derived from the alpha matte 76 of FIG. 7.

After enhancing the alpha matte (FIG. 3, block 38), the image compositing system 10 geometrically transforms the alpha matte to conform to the target head image in pose and size (FIG. 3, block 40). In this process, image compositing system 10 corrects for (in-plane) face pose differences by warping the alpha map (and the color-adjusted source head image, as described below). For example, the face in the source image 28 may be slightly tilted to the right while the face in the target image 30 may be tilted to the left. In such cases, the face needs to be rotated such that the face from the source image 28 can fit right into the face in the target image 30. In some examples, the image compositing system 10 warps the alpha matte using an affine transform that transforms the point ($x_s, y_s$) in the source image to the point ($x_s', y_s'$) in the target image in accordance with equation (3):

$$\begin{pmatrix} x_s' \\ y_s' \end{pmatrix} = \begin{pmatrix} a_1 & a_2 \\ a_3 & a_4 \end{pmatrix} \begin{pmatrix} x_s \\ y_s \end{pmatrix} + \begin{pmatrix} a_5 \\ a_6 \end{pmatrix} \qquad (3)$$

In these examples, the affine transformation parameters $a_1, \ldots, a_6$ are computed by using correspondences between the computed facial feature points in the source image and the target image. Note that the correspondences between the facial feature points in the source image and the target image are established implicitly in the face alignment process described above (see FIG. 3, blocks 32, 33). The image compositing system 10 determines the values of the affine parameters such that $$(a_1, a_2, a_3, a_4, a_5, a_6) = \operatorname{argmin} \sum_{i=1}^{88} (x'_s(i) - x_t(i))^2 + (y'_s(i) - y_t(i))^2 \quad (4)$$

The geometrically transformed alpha matte is passed to the composite image generation process that is described above in connection with block 56 of FIG. 3.

5. Skin Tone Compensation

Based on the cropped source image 62 (see FIG. 5), the image compositing system 10 generates a source skin map that segments skin areas from other areas in the cropped source image (FIG. 3, block 42).

In some examples the source skin map includes for each pixel of the input image a respective skin probability value indicating a degree to which the pixel corresponds to human skin. A characteristic feature of the source skin map is that all pixels of the cropped source image 62 having similar values are mapped to similar respective skin probability values in the skin map. As used herein with respect to pixel values, the term "similar" means that the pixel values are the same or nearly the same and appear nearly visually indistinguishable from one another. This feature of the skin map can be advantageous in, for example, pixels of certain human-skin image patches that have colors outside of the standard human-skin tone range. This may happen, for example, in shaded face-patches or alternatively in face highlights, where skin segments may sometimes have a false boundary between skin and non-skin regions. The skin map values vary continuously without artificial boundaries even in skin patches trailing far away from the standard human-skin tone range.

In general, the image compositing system 10 may ascertain the skin probability values indicating the degrees to which the input image pixels correspond to human skin in a wide variety of different ways.

In some examples, the image compositing system 10 computes the pixel intensity distributions of skin areas using the facial feature points. Samples from areas such as cheek or forehead are selected as those points are guaranteed to be skin areas. From those samples, the image compositing system 10 estimates conditional densities p(I|skin) where I is the pixel intensity. The image compositing system 10 then obtains the posterior probability $$p(\text{skin} \mid I) = \frac{p(I \mid \text{skin}) p(\text{skin})}{p(I)} \propto \frac{p(I \mid \text{skin})}{p(I)}, \quad (5)$$

where p(I) is obtained from the histogram of the pixel intensities for the given image. This posterior probability is used as a multiplier to the skin color compensation such that only the pixels that are likely to be from the skin pixels are modified while non-skin pixels are not changed. In some of these examples, the image compositing system 10 determine the skin map by thresholding the posterior probabilities p(skin|I) with an empirically determined threshold value.

In other examples, the image compositing system 10 ascertains the per-pixel human-skin probability values from human-skin tone probability distributions in respective channels of a color space (e.g., RGB, YCC, and LCH). For example, in some examples, the image compositing system 10 ascertains the per-pixel human-skin tone probability values from human-skin tone probability distributions in the CIE LCH color space (i.e., P(skin|L), P(skin|C), and P(skin|H)). These human-skin tone probability distributions are approximated by Gaussian normal distributions $G(p, \mu, \sigma)$ that are obtained from mean ($\mu$) and standard deviation ($\sigma$) values for each of the p=L, C, and H color channels. In some examples, the mean ($\mu$) and standard deviation ($\sigma$) values for each of the p=L, C, and H color channels are obtained from O. Martinez Bailac, "Semantic retrieval of memory color content", PhD Thesis, Universitat Autonoma de Barcelona, 2004. The image compositing system 10 ascertains a respective skin probability value for each pixel of the cropped source image 62 by converting the cropped source image 62 into the CIE LCH color space (if necessary), determining the respective skin-tone probability value for each of the L, C, and H color channels based on the corresponding human-skin tone probability distributions, and computing the product of the color channel probabilities, as shown in equation (6):

$$P(\text{skin}|L,C,H) \approx G(L,\mu_L,\sigma_L) \times G(C,\mu_C,\sigma_C) \times G(H,\mu_H,\sigma_H) \quad (6)$$

In some of these other examples, the skin map values are computed by applying to the probability function P(skin|L, C,H) a range adaptation function that provides a clearer distinction between skin and non-skin pixels. In some of these examples, the range adaptation function is a power function of the type defined in equation (7):

$$M_{SKIN}(x,y) = P(\text{skin}|L(i),C(i),H(i))^{1/\gamma} \quad (7)$$

where $\gamma > 0$ and $M_{SKIN}(x, y)$ are the skin map values at location (x, y). In one example, $\gamma = 32$. The skin map function defined in equation (7) attaches high probabilities to a large spectrum of skin tones, while non-skin features typically attain lower probabilities.

Figure 9:
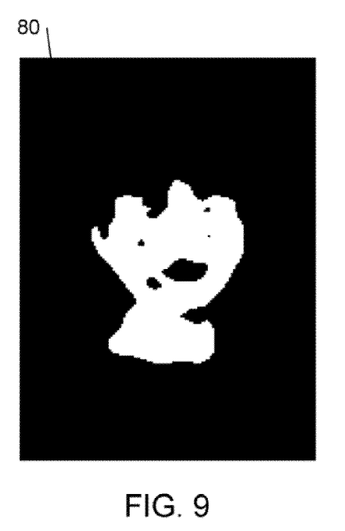
FIG. 9 is a diagrammatic view of an example skin map derived from the cropped source image of FIG. 5.

FIG. 9 shows an example skin map 80 that is derived from the cropped image 62 of FIG. 5.

Figure 10:
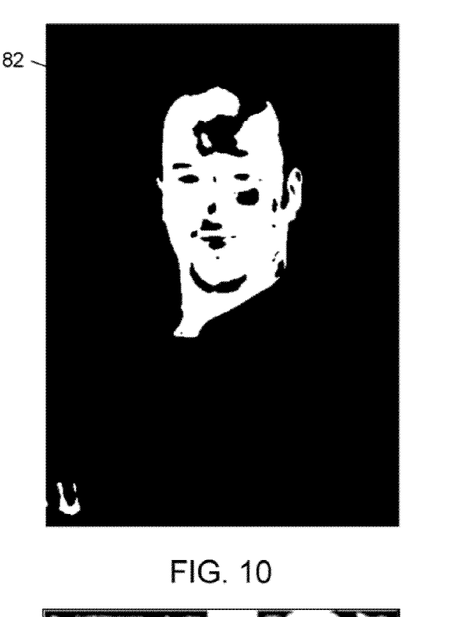
FIG. 10 is a diagrammatic view of an example skin map derived from an example target image.

In the illustrated example, the image compositing system 10 uses the same process to generate a target skin map that segments skin areas from other areas in the target image 30 (FIG. 3, block 46). In some examples, the target skin map is pre-computed and stored in association with the target image 30 (e.g., as metadata). FIG. 10 shows an example skin map 82 that is derived from the example target image 30.

Based on the source and target skin maps, the image compositing system 10 color-adjusts the cropped source image 62 (FIG. 3, block 50). The source skin areas of the cropped source image 62 that are identified in the source skin map have image values that are characterized by a source image value distribution. Similarly, the target skin areas of the target image 30 that are identified in the target skin map have image values that are characterized by a target image value distribution. The color adjustment process involves for each color channel adjusting image values of the source skin areas of the cropped source image 62 to have a modified image value distribution that is closer (e.g., in mean or variance or both mean and variance) to the target image value distribution than the source image value distribution is to the target image value distribution.

In some examples, the image values of the source skin areas are adjusted such that the modified image value distribution has a mean that is a linear combination of the means of the source image value distribution and the target image value distribution. In some examples, the image values of the source skin areas are adjusted such that the modified image value distribution and the target image value distribution are characterized by matching statistical variabilities (e.g., the same or substantially the same standard deviations). In some of these examples, both the mean and variance of the of the distribution of the source image values in a luminance color channel (e.g., the Y channel in the $YC_bC_r$ color space) are adjusted, whereas only the means of the of the distribution of the source image values in the chrominance color channels (e.g., the $C_b$ and $C_r$ channels in the $YC_bC_r$ color space) are adjusted. In one example, the source image value distributions in the luminance and chrominance color channels are adjusted in accordance with respective linear transformations that produce modified source image value distributions whose respective means are equal to the averages of the respective means of the source image value distributions and the target image value distributions, and the source image value distributions in the luminance color channel are additionally adjusted in accordance with a linear transformation that produces a modified source image value distribution with a variance (e.g., standard deviation) that is equal to the variance of the distribution of the target image values in the luminance channel. In other examples, these linear transformations are parameterized so that the degree of adjustment of the source image value distributions toward the target image value distributions can be adjusted.

In some examples, the image compositing system 10 also performs relighting processing on the skin-tone-compensated cropped source head image. The relighting compensates or corrects for the pixel intensity variations due to the illumination direction. For example, when the face is lit from the right side, there will be shadows on the left part of the nose. In these examples, the image compositing system 10 identifies shadow skin areas where the pixel intensities are darker than the neighboring skin pixels. Once the shadow skin areas are identified, the image compositing system 10 estimates the illumination direction and corrects the dark pixels belonging to shadow areas in the source face image. Similarly, the image compositing system 10 identifies shadow skin areas in the target face image and imposes those shadow areas on the blended image such that similar lighting conditions are achieved.

In the illustrated example, the image compositing system 10 also performs skin tone compensation on non-facial skin pixels in the target image that are identified in the target skin map (FIG. 3, block 48). In this process, the image compositing system 10 transforms image values of the non-facial skin regions in each color channel using a respective linear transformation that maps the distribution of skin tones in the target image 30 to a distribution that matches the skin tone distribution of the facial skin pixels in the skin-tone-compensated cropped source head image. In this process, one or more skin areas of the target image outside the location corresponding to the target head image can be color-adjusted based on the parameters (e.g., the mean and variances of the distributions of the source and target image value in the skin regions identified by the source and target skin maps) that are used in the adjusting of the image values of the source skin areas.

6. Geometrically Transforming the Source Head Image

The image compositing system 10 geometrically transforms the skin-tone-compensated source head image to conform to the target head image in pose and size (FIG. 3, block 52). In some examples, the image compositing system 10 geometrically transforms the skin-tone-compensated source head image in accordance with the same transformation that is used to geometrically transform the alpha matte (see FIG. 3, block 40).

7. Generating the Composite Image

The image compositing system 10 generates the composite image 58 based on the geometrically transformed alpha matte, the geometrically transformed and skin-tone-compensated source head image, and the color-adjusted target image (FIG. 3, block 56). In some examples, the composite image 58 is created by performing weighted blending of the geometrically transformed and skin-tone-compensated source head image and the color-adjusted target image, where the weights are defined in the geometrically transformed alpha matte. In some examples, prior to blending, the image compositing system 10 resizes the geometrically transformed alpha matte and the geometrically transformed and skin-tone-compensated source head image such that the source head image entirely covers the target head image in the target image 30 in order to ensure that only the head from source image 28 is visible in the composite image 58.

Figure 11:
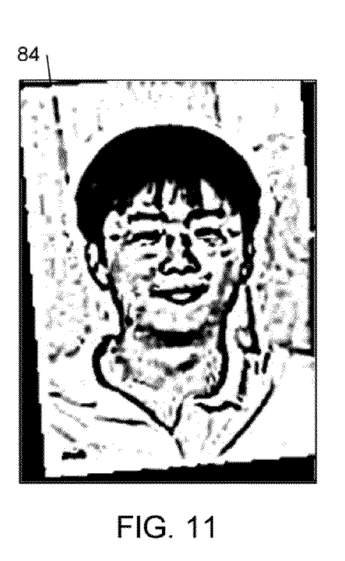
FIG. 11 is a diagrammatic view of an example color-adjusted and geometrically transformed image derived from the cropped source image of FIG. 5.
Figure 12:
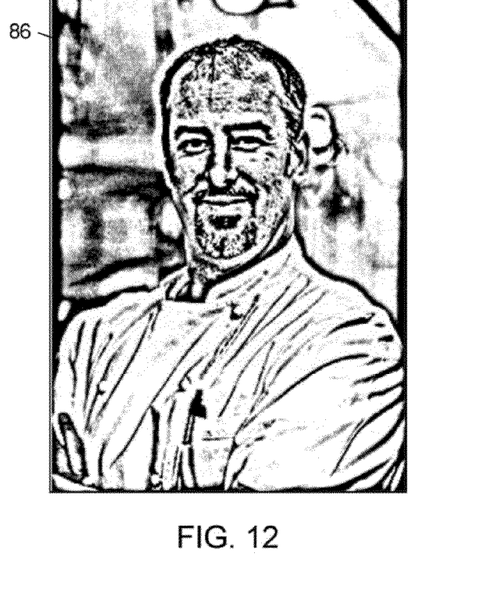
FIG. 12 is a diagrammatic view of an example color-adjusted target image derived from the example target image used to derive the skin map of FIG. 10.
Figure 13:
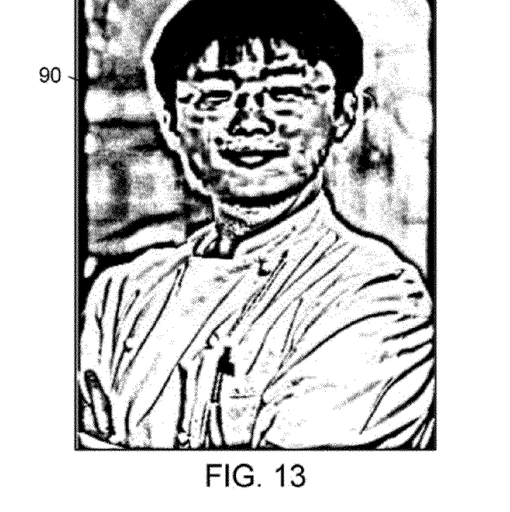
FIG. 13 is a diagrammatic view of an example composite image derived from the color-adjusted and geometrically transformed image of FIG. 11 and the color-adjusted target image of FIG. 12.

FIG. 11 shows an example color-adjusted and geometrically transformed and skin-tone-compensated source head image 84 that is derived from the cropped source image 62 of FIG. 5. FIG. 12 shows an example color-adjusted target image 86 that is derived from the example target image 30. FIG. 13 shows an example composite image 90 that is derived from the geometrically transformed and skin-tone-compensated source head image 84 of FIG. 11 and the color-adjusted target image 86 of FIG. 12.

III. EXAMPLE OPERATING ENVIRONMENTS

In general, the image compositing system 10 typically includes one or more discrete data processing components, each of which may be in the form of any one of various commercially available data processing chips. In some implementations, the image compositing system 10 is embedded in the hardware of any one of a wide variety of digital and analog computer devices, including desktop, workstation, and server computers. In some examples, the image compositing system 10 executes process instructions (e.g., machine-readable code, such as computer software) in the process of implementing the methods that are described herein. These process instructions, as well as the data generated in the course of their execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

Figure 14:
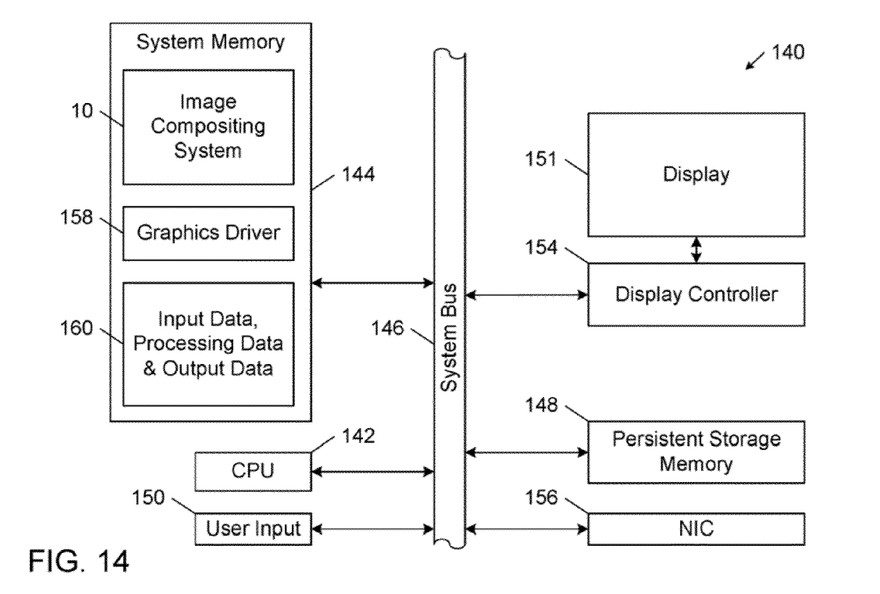
FIG. 14 is a block diagram of an example of a computer that incorporates an example of the image compositing system of FIG. 1.

FIG. 14 shows an example of a computer system 140 that can implement any of the examples of the image compositing system 10 that are described herein. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer system 140 using one or more input devices 150 (e.g., a keyboard, a computer mouse, a microphone, joystick, and touch pad). Information may be presented through a user interface that is displayed to a user on the display 151 (implemented by, e.g., a display monitor), which is controlled by a display controller 154 (implemented by, e.g., a video graphics card). The computer system 140 also typically includes peripheral output devices, such as speakers and a printer. One or more remote computers may be connected to the computer system 140 through a network interface card (NIC) 156.

As shown in FIG. 14, the system memory 144 also stores the image compositing system 10, a graphics driver 158, and processing information 160 that includes input data, processing data, and output data. In some examples, the image compositing system 10 interfaces with the graphics driver 158 to present a user interface on the display 151 for managing and controlling the operation of the image compositing system 10.

IV. CONCLUSION

The examples that are described herein provide improved systems and methods of compositing images into target images. These examples segment head regions from source images with high-fidelity, which allows the segmented head regions to be merged seamlessly into target images to produce composite images with more authentic-looking merged results than methods that only swap faces. For example, at least some of these examples are able to extract head regions that include both hair and faces and composite the extracted head regions in place of target head regions in target images. This improves the authenticity of the appearance of images of persons that are merged in the composite images because hair can play an important role in the appearance of a person.

Other embodiments are within the scope of the claims.

The invention claimed is:

1. A method, comprising:
    segmenting a head image from a source image based on a model of the source image as a mixture of at least two image layers, wherein one or more of the image layers are components of a foreground corresponding to the source head image and one or more other ones of the image layers are components of a background corresponding to parts of the source image outside the source head image;
    color-adjusting the source head image based on skin regions of a target head image in a target image;
    geometrically transforming the color-adjusted source head image to conform to the target head image in pose and size; and
    generating a composite image, wherein the generating comprises compositing the geometrically transformed and color-adjusted source head image into a version of the target image at a location corresponding to the target head image.

2. The method of claim 1, wherein the segmenting comprises determining an initialization map identifying regions of the source image corresponding to the foreground and identifying regions of the source image corresponding to the background.

3. The method of claim 2, further comprising ascertaining locations of facial features in the source image, wherein the determining comprises producing the initialization map based on the locations of the facial features.

4. The method of claim 3, wherein the producing comprises determining regions of facial image content and hair image content in the source image based on locations of respective ones of the facial features, and labeling the determined regions as foreground in the initialization map.

5. The method of claim 2, wherein the segmenting comprises deriving from the initialization map an alpha matte that specifies respective contributions of the image layers to the foreground and the background.

6. The method of claim 5, wherein the compositing comprises performing a weighted blending of the geometrically transformed and color-adjusted source head image and the version of the target image in accordance with the alpha matte.

7. The method of claim 5, wherein the deriving comprises removing neck regions from the foreground in the alpha matte.

8. The method of claim 1, further comprising determining source skin areas of the source head image, wherein the source skin areas have image values characterized by a source image value distribution, and the color-adjusting comprises adjusting image values of the source skin areas to have a modified image value distribution that is closer to a target image value distribution of image values of skin areas of the target head image than the source image value distribution is to the target image value distribution.

9. The method of claim 8, further comprising ascertaining locations of facial features in the source image, wherein the determining comprises determining probabilities of the image values corresponding to skin areas based on ascertained locations of the facial features and determining the source skin areas based on the determined probabilities.

10. The method of claim 8, wherein the color-adjusting comprises adjusting the image values of the source skin areas such that the modified image value distribution has a mean that is a linear combination of respective means of the source image value distribution and the target image value distribution.

11. The method of claim 8, wherein the color-adjusting comprises adjusting the image values of the source skin areas such that the modified image value distribution and the target image value distribution are characterized by matching statistical variabilities.

12. The method of claim 8, further comprising color-adjusting one or more skin areas of the target image outside the location corresponding to the target head image based on parameters used in the adjusting of the image values of the source skin areas.

13. Apparatus, comprising:
    a memory storing computer-readable instructions; and
    a processor coupled to the memory, to execute the instructions, and based at least in part on the execution of the instructions, to perform operations comprising
        segmenting a head image from a source image based on a model of the source image as a mixture of at least two image layers, wherein one or more of the image layers are components of a foreground corresponding to the source head image and one or more other ones of the image layers are components of a background corresponding to parts of the source image outside the source head image;
        color-adjusting the source head image based on skin regions of a target head image in a target image;

geometrically transforming the color-adjusted source head image to conform to the target head image in pose and size; and generating a composite image, wherein the generating comprises compositing the geometrically transformed and color-adjusted source head image into a version of the target image at a location corresponding to the target head image.

14. The apparatus of claim 13, wherein in the segmenting the processor performs operations comprising determining an initialization map identifying regions of the source image corresponding to the foreground and identifying regions of the source image corresponding to the background.

15. The apparatus of claim 14, wherein in the segmenting the processor performs operations comprising deriving from the initialization map an alpha matte that specifies respective contributions of the image layers to the foreground and the background.

16. The apparatus of claim 13, wherein based at least in part on the execution of the instructions, the processor performs operations further comprising determining source skin areas of the source head image, wherein the source skin areas have image values characterized by a source image value distribution, and the color-adjusting comprises adjusting image values of the source skin areas to have a modified image value distribution that is closer to a target image value distribution of image values of skin areas of the target head image than the source image value distribution is to the target image value distribution.

17. At least one non-transitory computer-readable medium storing computer-readable program code adapted to be executed by a computer to implement a method comprising:

segmenting a head image from a source image based on a model of the source image as a mixture of at least two image layers, wherein one or more of the image layers are components of a foreground corresponding to the source head image and one or more other ones of the image layers are components of a background corresponding to parts of the source image outside the source head image;

color-adjusting the source head image based on skin regions of a target head image in a target image;

geometrically transforming the color-adjusted source head image to conform to the target head image in pose and size; and generating a composite image, wherein the generating comprises compositing the geometrically transformed and color-adjusted source head image into a version of the target image at a location corresponding to the target head image.

18. The at least one non-transitory computer-readable medium of claim 17, wherein the segmenting comprises determining an initialization map identifying regions of the source image corresponding to the foreground and identifying regions of the source image corresponding to the background.

19. The at least one non-transitory computer-readable medium of claim 18, wherein the segmenting comprises deriving from the initialization map an alpha matte that specifies respective contributions of the image layers to the foreground and the background.

20. The at least one non-transitory computer-readable medium of claim 17, wherein the method further comprises determining source skin areas of the source head image, wherein the source skin areas have image values characterized by a source image value distribution, and the color-adjusting comprises adjusting image values of the source skin areas to have a modified image value distribution that is closer to a target image value distribution of image values of skin areas of the target head image than the source image value distribution is to the target image value distribution.

* * * * *